(12) United States Patent
Tanimura et al.

(10) Patent No.: US 8,797,700 B2
(45) Date of Patent: Aug. 5, 2014

(54) APPARATUS FOR DETECTING TEMPERATURE OF SWITCHING ELEMENTS

(75) Inventors: Yasunari Tanimura, Takahama (JP); Shinichiro Nakata, Anjo (JP); Tsuneo Maebara, Nagoya (JP); Yusuke Shindo, Nagoya (JP)

(73) Assignee: Denso Corporation, Kariya (JP)

( * ) Notice: Subject to any disclaimer, the term of this patent is extended or adjusted under 35 U.S.C. 154(b) by 343 days.

(21) Appl. No.: 13/404,220

(22) Filed: Feb. 24, 2012

(65) Prior Publication Data

US 2012/0219033 A1 Aug. 30, 2012

(30) Foreign Application Priority Data

Feb. 25, 2011 (JP) ................................. 2011-039342

(51) Int. Cl.
*H02H 5/04* (2006.01)
(52) U.S. Cl.
USPC ......................................................... 361/103
(58) Field of Classification Search
CPC .......... H03K 17/081; H03K 17/08104; H03K 17/08108; H03K 17/08112; H03K 17/08116; H03K 17/8012; H03K 17/08122; H03K 17/08124; H03K 17/08126; H03K 17/08128; G01K 15/007
USPC ............ 363/56.01; 374/1, 163, 208; 361/103, 361/106
See application file for complete search history.

(56) References Cited

U.S. PATENT DOCUMENTS

| 7,453,679 | B2* | 11/2008 | Yokai et al. | 361/93.8 |
|---|---|---|---|---|
| 7,990,674 | B2* | 8/2011 | Kato et al. | 361/103 |
| 2006/0289461 | A1* | 12/2006 | Kojima et al. | 219/497 |
| 2007/0064370 | A1* | 3/2007 | Kajiwara | 361/103 |
| 2007/0201176 | A1* | 8/2007 | Yokai et al. | 361/103 |
| 2009/0237853 | A1* | 9/2009 | Kato et al. | 361/103 |

FOREIGN PATENT DOCUMENTS

| JP | 2007-195294 | 8/2007 |
|---|---|---|
| JP | 2008-017615 | 1/2008 |
| JP | 2009-164956 | 7/2009 |
| JP | P2010-199490 A | 9/2010 |

* cited by examiner

*Primary Examiner* — Hezron E Williams
*Assistant Examiner* — Nathaniel Kolb
(74) *Attorney, Agent, or Firm* — Nixon & Vanderhye P.C.

(57) ABSTRACT

A temperature detecting apparatus includes an integrated circuit that integrates an overheating detecting circuit, a breakage detecting circuit and a disabling circuit, and an element connection terminal connecting a temperature sensing element. The disabling circuit disables the breakage detecting circuit from detecting a breakage of wire when a voltage at the element connection exceeds a disabling threshold which is set higher than an overheating detection threshold and a breakage detection threshold. A predetermined voltage higher than the disabling threshold is applied to the element connection terminal when the temperature sensing element is not connected to the element connection terminal.

13 Claims, 4 Drawing Sheets

US 8,797,700 B2

APPARATUS FOR DETECTING TEMPERATURE OF SWITCHING ELEMENTS

CROSS REFERENCE TO RELATED APPLICATION

This application is based on and claims the benefit of priority from earlier Japanese Patent Application No. 2011-39342 filed on Feb. 25, 2011 the description of which is incorporated herein by reference.

BACKGROUND

1. Technical Field

The present application relates to an apparatus for detecting temperature of switching elements, and more particularly, to the apparatus provided with an overheat detection circuit which is for detecting overheat at semiconductor switching elements.

2. Description of the Related Art

Conventionally, temperature detecting apparatuses has been employed in various systems. For example, Japanese Patent Application Laid-open Publication No. 2010-199490 discloses a temperature measurement apparatus as a temperature detecting apparatus having a temperature sensing element that detects temperature of a target object. This apparatus additionally includes an overheating detection circuit that detects overheating of the target object based on the detection result of the temperature sensing element.

The temperature measurement apparatus detects the temperature of an IGBT (insulated gate bipolar transistor) device and protects the IGBT device from overheating. The temperature measurement apparatus includes a temperature sensing diode and an IGBT protection circuit. The temperature sensing diode detects the temperature of the IGBT device. The temperature sensing diode allows a constant current to flow and outputs voltage based on the temperature of the IGBT device. The IGBT protection circuit detects overheating of the IGBT device based on the temperature detected by the temperature sensing diode and protects the IGBT device. The IGBT protection circuit supplies a constant current to the temperature sensing diode and compares the voltage of the temperature sensing diode with a predetermined threshold thereby detecting overheating of the IGBT device. The IGBT protection circuit outputs an IGBT protection signal when detecting overheating of the IGBT device.

Moreover, the above-described IGBT protection circuit may include a breakage detection circuit. The breakage detection circuit detects a wire-breakage of a temperature sensing diode or the like based on the voltage at a connection terminal that connects the temperature sensing diode.

There is a requirement that the IGBT protection circuit is used without requiring the temperature sensing diode. However, when the temperature sensing diode is not used, the temperature sensing diode is not connected to the connection terminal so that the breakage detection circuit erroneously detects a breakage of wire. Therefore, a dummy resistor in which constant current flows to output a constant voltage regardless of a temperature variation is connected to the connection terminal. As a result, the breakage detection circuit can be configured to avoid erroneously detecting wire breakage. In this regard, a dummy resistor is necessarily used. Therefore, considering the breakage detection circuit is used for a power conversion apparatus in which a plurality of IGBT devices are disposed, the number of components increases. Accordingly, the power conversion apparatus cannot be shrunk in its size and manufacturing cost increases as well.

SUMMARY

The present application provides a temperature detecting apparatus in which detection of abnormality such as breakage of wire can be disabled when a temperature sensing element is not connected thereto without connecting a dummy resistor.

Through keen research conducted to solve the above-described issues, the inventors of the present application have found that, a disabling circuit that disables detecting an abnormality based on a voltage at a terminal where the temperature sensing element is connected, which is integrated to an IC (integrated circuit) together with an overheating detecting circuit and an abnormality detecting circuit, whereby the abnormality can be disabled without connecting the dummy resistor.

As a first aspect of the present application, an embodiment provides a temperature detecting apparatus that detects temperature of an object, the apparatus including: a temperature sensing element that outputs voltage responding to the temperature of the object, the voltage outputted by the temperature sensing element having a predetermined voltage range; an element connection terminal capable of connecting the temperature sensing element; an overheating detecting circuit that detects an overheating of the object, the overheating detecting circuit detecting the overheating based on a comparison between a voltage at the temperature sensing element and an overheating detection threshold being set within the predetermined voltage range; an abnormality detecting circuit that detects an abnormality of the temperature sensing element and a wiring of the temperature sensing element, the abnormality detecting circuit detecting an abnormality based on a comparison between the voltage at the temperature sensing element and an abnormality detection threshold being set beyond the predetermined voltage range; and a disabling circuit that disables the abnormality detecting circuit from detecting an abnormality of the temperature sensing element.

The overheating detecting circuit, the abnormality detecting circuit and the disabling circuit are integrated to an integrated circuit, the disabling circuit disables the abnormality detecting circuit from detecting an abnormality when the voltage at the temperature sensing element is higher than a disabling threshold being set higher than the overheating detection threshold and the abnormality detection threshold, and a voltage higher than the disabling threshold is applied to the element connection terminal when the temperature sensing element is not connected to the element connection terminal.

According to this configuration, even when the dummy resistor is not connected thereto, detecting abnormality can be disabled.

As a second aspect, the temperature detecting apparatus includes a power supply circuit integrated to the integrated circuit. The power supply circuit generates a regulated voltage to be lower than a voltage of a DC power source and supplies the regulated voltage to the overheating detecting circuit, the abnormality detecting circuit and the disabling circuit. The overheating detection threshold and the abnormality detection threshold are set to be lower than the regulated voltage, the disabling threshold is set to be higher than the regulated voltage and lower than the voltage of the DC power source and the voltage of the DC power source is applied to the element connection terminal when the temperature sensing element is not connected to the element connection terminal.

According to this configuration, the disabling threshold can be reliably set higher than the overheating detection threshold and the abnormality detection threshold. Moreover, a voltage higher than the abnormality detection threshold can be reliably applied to the element connection terminal. Therefore, even when the temperature sensing element is not connected to the temperature detecting apparatus, detecting an abnormality can be disabled without connecting the dummy resistor.

As a third aspect, the overheating detection threshold and the abnormality detection threshold are set to be a voltage divided from the regulated voltage. According to this configuration, the overheating detection threshold and the abnormality detection threshold can be reliably set lower than the regulated voltage.

As a fourth aspect, the temperature sensing element is a diode. According to this configuration, a voltage responding to the temperature of the object can be reliably obtained.

As a fifth aspect, the object is a switching element disposed in a power conversion apparatus. According to this configuration, in the temperature detecting apparatus that detests an overheating of the switching element disposed in the power conversion apparatus, even when the temperature sensing element is not connected to the apparatus, detecting an abnormality can be disabled without connecting dummy resistor.

As a sixth aspect, the temperature detecting apparatus is mounted on a vehicle and supplies power to a vehicle drive motor. According to this configuration, in the temperature detecting apparatus that detests an overheating of the switching element disposed in the power conversion apparatus used for supplying power to the vehicle drive motor, even when the temperature sensing element is not connected to the apparatus, detecting an abnormality can be disabled without connecting dummy resistor.

DETAILED DESCRIPTION OF THE PREFERRED EMBODIMENTS

Next, the present application is described in detail in accordance with an embodiment. In the embodiment, the temperature detecting apparatus of the present application is applied to a motor control apparatus mounted on a vehicle, which controls a vehicle drive motor.

Figure 1:
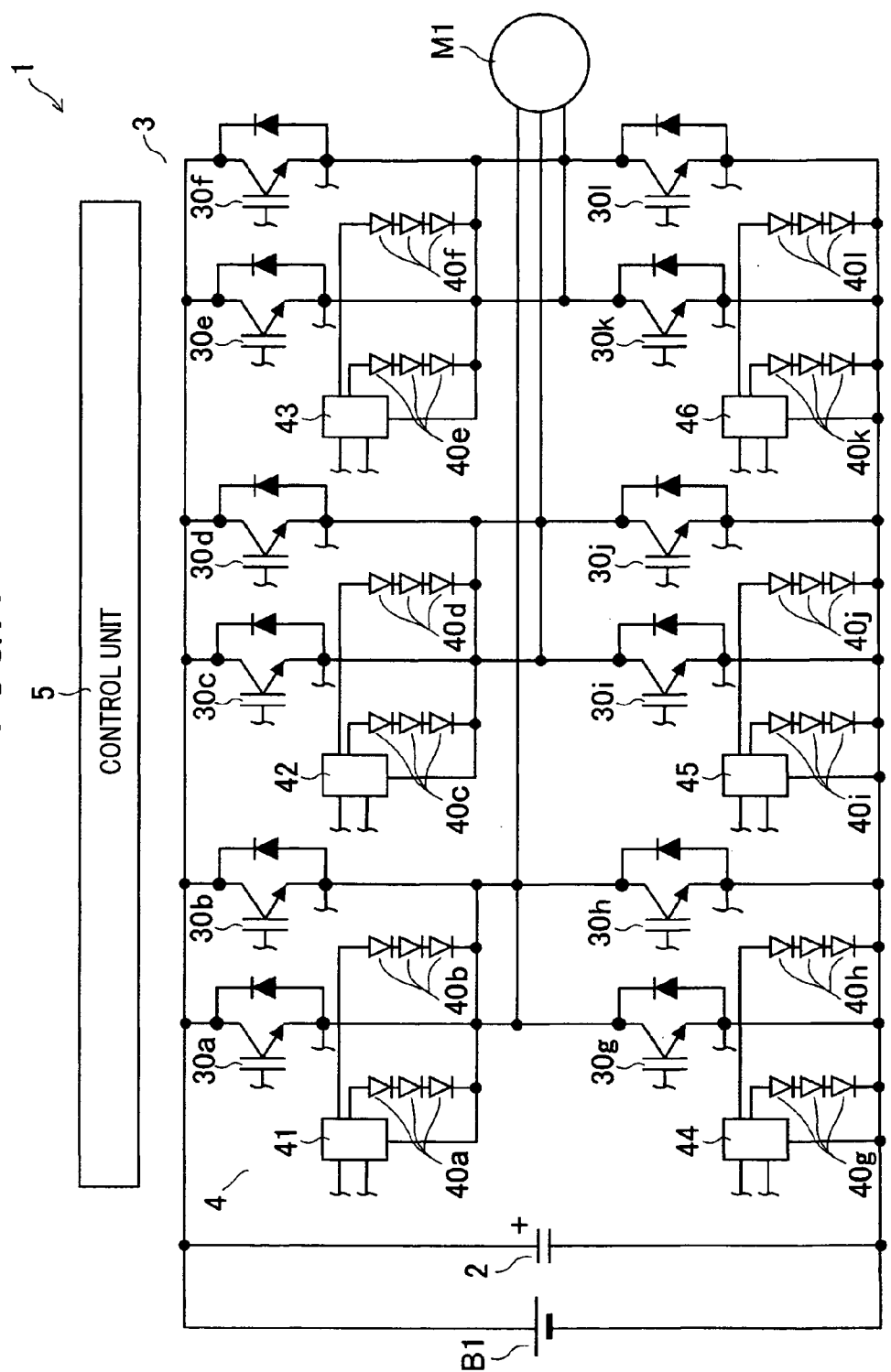
FIG. 1 is a circuit diagram showing a motor control apparatus according to the embodiment of the present application.

With reference to FIGS. 1 to 4, a configuration of the motor control apparatus according to the embodiment is now described as follows, FIG. 1 is a circuit diagram showing the motor control apparatus according to the embodiment.

The motor control apparatus 1 which functions as a power conversion apparatus, as shown in FIG. 1 converts DC (direct current) high voltage, e.g. 288 volts outputted from a high voltage battery B1 being isolated from the vehicle-body into three-phase AC (alternating current) voltage and supplies the vehicle drive motor M1 with the converted three-phase AC voltage thereby controlling the vehicle drive motor M1. The motor control apparatus includes a smoothing capacitor 2, an inverter unit, a temperature detecting apparatus 4 and control unit 5.

The smoothing capacitor 2 smoothes the DC high voltage of the high voltage battery B1. One end of the smoothing capacitor 2 is connected to the positive terminal of the high voltage battery B1, and the other end is connected to the negative terminal of the high voltage battery B1.

The inverter unit 3 converts the DC voltage smoothed by the smoothing capacitor 2 into the three-phase AC voltage and supplies the converted AC voltage to the vehicle drive motor M1. The inverter unit 3 includes IGBTs $30a$, $30b$, $30c$, $30d$, $30e$, $30f$ $30g$, $30h$, $30i$, $30j$, $30k$ and $30l$.

The IGBTs $30a$ to $30l$ (i.e., object, switching element) is driven by controlling the gate voltage. The IGBTs $30a$ to $30l$ serve as switching elements so as to convert the DC voltage smoothed by the smoothing capacitor 2 into the three-phase AC voltage. Each of the IGBT pairs $30a$-$30b$, $30c$-$30d$, $30e$-$30f$, $30g$-$30h$, $30i$-$30j$ and $30k$-$30l$ are connected in parallel. The parallel-connected IGBT pairs $30a$-$30b$ and $30g$-$30h$, $30c$-$30d$ and $30i$-$30j$, and $30e$-$30f$ and $30k$-$30l$ are connected in series. Moreover, regarding the above-described series-connected IGBT groups between parallel-connected IGBT pairs, three combinations of IGBTs $30a$-$30b$/$30g$-$30h$, IGBTs $30c$-$30d$/$30i$-$30j$ and IGBTs $30e$-$30f$/$30k$-$30l$ are connected in parallel. The collector terminals of the IGBTs $30a$ to $30f$ are connected to one end of the smoothing capacitor 2 and the emitter terminals of the IGBT $30g$ to $30l$ are connected to the other end of the smoothing capacitor 2. Further, the connection point where the IGBT $30a$-$30b$ and the IGBT $30g$-$30h$ are connected in series, the connection point where the IGBT $30c$-$30d$ and the IGBT $30i$-$30j$ are connected in series and the connection point where the IGBT $30e$-$30f$ and the IGBT $30k$-$30l$ are connected in series, are connected to the vehicle drive motor M1.

The temperature detecting apparatus 4 detects temperature of the IGBTs $30a$ to $30l$, breakage of temperature sensing diodes $40a$, $40b$, $40c$, $40d$, $40e$, $40f$, $40g$, $40h$, $40i$, $40j$, $40k$ and $40l$ (described later) and breakage at the wires of the temperature sensing diodes $40a$ to $40l$. The temperature detecting apparatus 4 includes the temperature sensing diodes $40a$ to $40l$ (i.e., temperature sensing element, diodes) and temperature sensing integrated circuits (ICs) 41 to 46.

The temperature sensing diodes $40a$ to $40l$ allow constant current to flow therethrough whereby the temperature sensing diodes output voltage based on the temperature. Specifically, the temperature sensing diodes serves as an element in which the voltage thereof decreases in response to increasing temperature. The temperature sensing diodes $40a$ to $40l$ are disposed integrally with the IGBTs $30a$ to $30l$ respectively. Each of the temperature sensing diodes $40a$ to $40l$ includes three series-connected diodes. Among the three series-connected diodes in the temperature sensing diode $40a$, the anode at one end side of the temperature sensing diode $40a$ is connected to the temperature sensing IC 41. Meanwhile, the cathode at the other end side of the temperature sensing diode $40a$ is connected to the emitter of the IGBT $30a$. Among the three series-connected diodes in the temperature sensing diode $40b$, the anode of one end side of the temperature sensing diode $40b$ is connected to the temperature sensing IC 42. The cathode of the other end side of the temperature sensing diode 40b is connected to the emitter of the IGBT 30b. Other temperature sensing diodes 40c to 40l have similar configuration.

Figure 2:
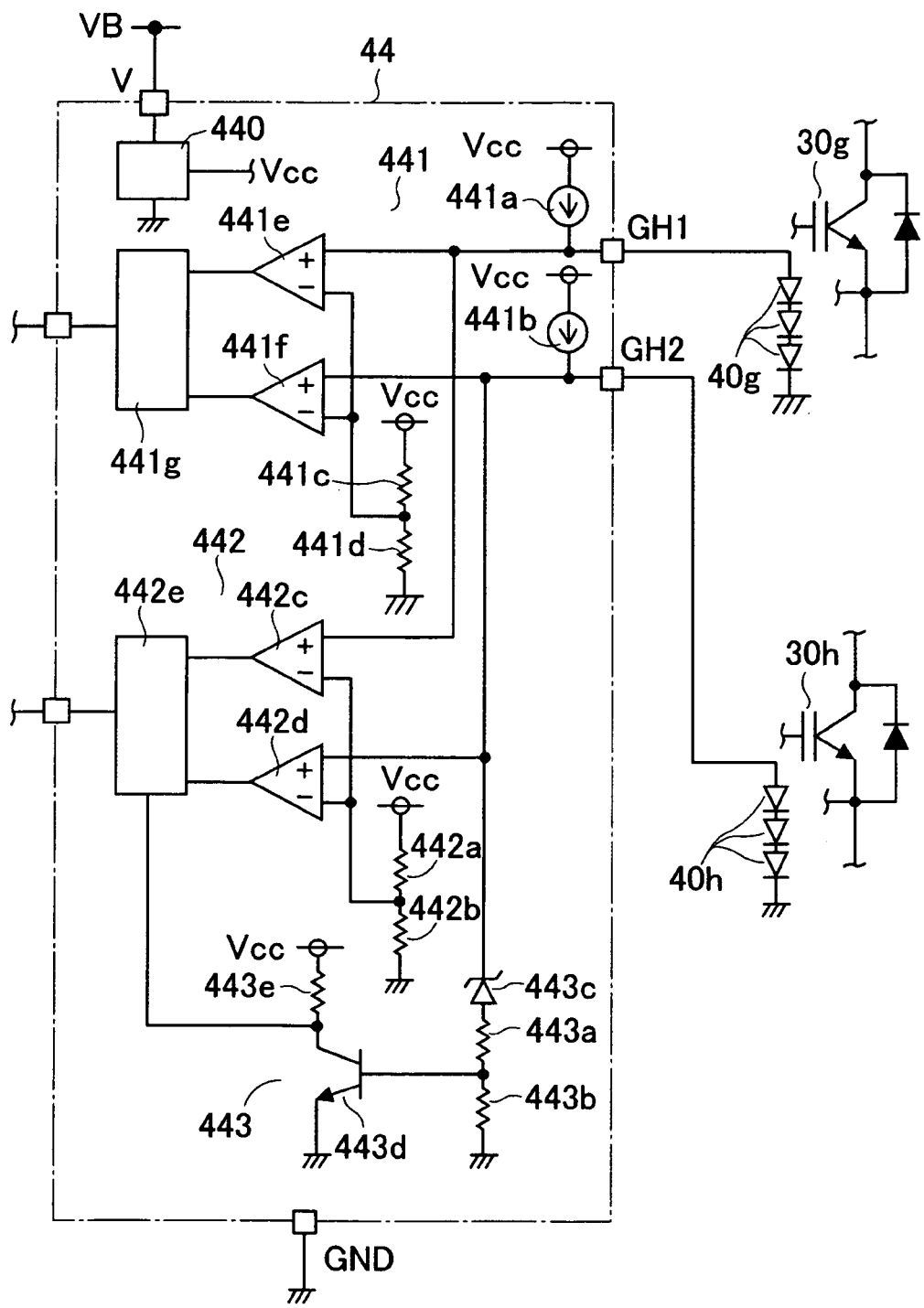
FIG. 2 is a circuit diagram showing a temperature detecting apparatus in FIG. 1.

The temperature sensing ICs 41, 42, 43, 44, 45 and 46 detect overheating of the IGBTs 30a to 30l based on the detecting result of the temperature sensing diodes 40a to 40l and breakage of temperature sensing diodes 40a to 40l and breakage at the wires of the temperature sensing diodes 40a to 40l. As shown in FIG. 2, temperature sensing IC 44 includes a power supply circuit 440, an overheating detecting circuit 441, a breakage detecting circuit 442 (abnormality detecting circuit) and breakage-detection-disabling circuit 443 (disabling circuit). The power supply circuit 440, the overheating detecting circuit 441, the breakage detecting circuit 442 and the breakage-detection-disabling circuit 443 are integrated as an IC.

The power supply circuit 440 outputs voltage used for operating the overheating detecting circuit 441, the breakage detecting circuit 442 and the breakage-detection-disabling circuit 443. The power supply circuit 440 regulates the output voltage Vcc (e.g. 4.5V to 6V) which is stepped down from internal DC low voltage VB of a low voltage battery (e.g. 16V to 19V, voltage of DC power source). The input terminal of the power supply circuit 440 is connected to the internal DC voltage via the power supply terminal V of the temperature sensing IC 44. The positive terminal of the power supply circuit 440 is connected to each of the overheating detecting circuit 441, the breakage detecting circuit 442 and the breakage-detecting-disabling circuit 443. The negative terminal of the power supply circuit 440 is connected to the ground terminal GND of the temperature sensing IC 44.

The overheating detecting circuit 441 includes diode connection terminals GH1 and GH2 (i.e., element connection terminal) that connects series-connected temperature sensing diodes 40g and 40h respectively. The overheating detecting circuit 441 compares the voltages at the diode connection terminals GH1 and GH2 with an overheating-detection threshold Vth1 and detects overheating of the IGBT 30g and 30h based on a result of the comparison. The overheating detecting circuit 441 includes constant current circuits 441a and 441b, resistors 441c and 441d, comparators 441e and 441f, and an overheating signal output circuit 441g.

The constant current circuits 441a and 441b supply constant current to the series-connected temperature sensing diodes 40g and 40h respectively. The power terminals of the constant current circuit 441a and 441b are connected to the positive terminal of the power supply circuit 440. The output terminals of the constant current circuits 441a and 441b are connected to the temperature sensing diodes 40g and 40h via the diode connection terminals GH1 and GH2 respectively. Specifically, the output terminals are connected to the anodes of the temperature sensing diodes 40g and 40h respectively.

The resistors 441c and 441d are used for setting the overheating-detection threshold Vth1 such that the output voltage Vcc of the power supply circuit 440 is divided by the resistors 441c and 441d to generate the voltage corresponding to the overheating-detection threshold Vth1. The resistors 441c and 441d are connected in series. One end of the resistor 441c is connected to the positive terminal of the power supply circuit 440. One end of the resistor 441d is connected to the ground terminal GND. The connection point where the resistor 441c and the resistor 441d are connected in series is connected to the comparators 441e and 441f.

The comparators 441e and 441f are devices used for comparing voltages at the diode connection terminals GH1 and GH2 of the temperature sensing diodes with the overheating-detection threshold Vth1. Specifically, when the voltages at the diode connection terminals GH1 and GH2 of the temperature sensing diodes become lower than the overheating-detection threshold Vth1, the comparators 441e and 441f output low level signals. The non-inverting input terminal of the comparator 441e is connected to the diode connection terminal GH1 of the temperature sensing diode. The inverting-input terminal of the comparator 441e is connected to the connection point where the resistors 441c and 441e are connected in series. The output terminal is connected to the overheating signal output circuit 441g. The non-inverting input terminal of the comparator 441f is connected to the diode connection terminal GH2, and the inverting input terminal is connected to the connection point where the resistors 441c and 441d are connected in series. The output terminals of the comparator 441e and 441f are connected to the overheating signal output circuit 441g.

The overheating signal output circuit 441g is configured to determine that overheating has occurred in either IGBT 30g or IGBT 30h when either comparator 441e or comparator 441f outputs low level signal and outputs overheating signal to the control unit 5. The input terminal of the overheating signal output circuit 441g is connected to the output terminals of the comparators 441g and 441f. The output terminal of the overheating signal output circuit 441g is connected to the control unit 5.

The breakage detecting circuit 442 compares the voltages at the diode connection terminals GH1 and GH2 with a breakage-detection threshold Vth2 (abnormality detection threshold) and detects breakage of the temperature sensing diodes 40g and 40h and wire-breakage thereof based on a result of the comparison. The breakage detection circuit 442 includes resistors 442a, 442b, comparators 442c, 442d and a breakage signal output circuit 442e.

The resistors 442a and 442b are used for setting the breakage-detection threshold Vth2 such that the output voltage Vcc of the power supply circuit 440 is divided by the resistors 442a and 441b to generate the voltage corresponding to the breakage-detection threshold Vth2. The resistors 442a and 442b are connected in series. One end of the resistor 442a is connected to the positive terminal of the power supply circuit 440. One end of the resistor 442b is connected to the ground terminal GND. The connection point where the resistors 442a and 442b are connected is connected to the comparators 442c and 442d.

The comparators 442c and 442d compare the voltages at the diode connection terminals GH1 and GH2 with the breakage-detection threshold Vth2. Specifically, the comparators 442c and 442d output high level signal when the voltages at the diode connection terminals GH1 and GH2 becomes higher than the breakage-detection threshold Vth2. The non-inverting input terminal of the comparator 442c is connected the diode connection terminal GH1. The inverting input terminals of the comparators 442c and 442d are connected to the connection point where the resistors 442a and 442b are connected in series. The output terminals are connected to a breakage judgment circuit 442e. The non-inverting input terminal of the comparator 442d is connected to the diode connection terminal GH2. The inverting input terminals of the comparators 442c and 442d are connected to the connection point where the resistors 442a and 442b are connected in series. The output terminals are connected to the breakage judgment circuit 442e.

The breakage signal output circuit 442e is configured to determine that breakage has occurred in either temperature sensing diodes 40g or 40h, or wirings thereof when either comparator 442c or comparator 442d outputs a high level signal, and output a breakage so signal to the control unit 5. However, breakage-detection for the temperature sensing diode 40h and the wiring thereof is disabled while the breakage-detection-disabling circuit 443 outputs a low level signal. Therefore, even when the temperature sensing diode 40h is not connected to the diode connection terminal, erroneously outputting the breakage signal for the temperature sensing diode 40h can be avoided. The input terminal of the breakage signal output circuit 442e is connected to the output terminals of the comparators 442c and 442d and the breakage-detection-disabling circuit 443. The output terminal of the breakage signal output circuit 442e is connected to the control unit 5.

The breakage-detection-disabling circuit 443 disables the breakage-detection for the temperature sensing diode 40h when the temperature sensing diode is not connected. Specifically, when the voltage at the diode connection terminal GH2 is higher than the breakage-detection-disabling threshold Vth3 (disabling threshold), the breakage-detection-disabling circuit 443 disables breakage-detection of the breakage detecting circuit 442 for the temperature sensing diode 40h. The breakage-detection-disabling circuit 443 includes resistors 443a and 443b, Zener diode 443c, a transistor 443d and a resistor 443e.

The resistors 443a and 443b, and Zener diode 443c are circuit components used for setting the breakage-detection-disabling threshold Vth3. Specifically, the circuit components are used for supplying enough voltage to turn ON the transistor 443d when the voltage at the diode connection terminal GH2 is higher than the breakage-detection-disabling threshold Vth3. The resistor 443a and 443b are connected in series. One end of the resistor 443a is connected to the diode connection terminal GH2 via the Zener diode 443c. That is, one end of the resistor 443a is connected to the anode terminal of the Zener diode 443c and the cathode terminal of the Zener diode 443c is connected to the diode connection terminal GH2. One end of the resistor 443b is connected to the ground terminal of the GND. Further, the connection point where the resistors 443a and 443b are connected in series is connected to the transistor 443d.

The transistor 443d turn ON when the voltage at the diode connection terminal GH2 is higher than the breakage-detection-disabling threshold Vth3 and outputs low level signal. The base terminal of the transistor 443d is connected to the connection point where the resistor 443a and 443b are connected in series. The collector terminal thereof is connected to the positive terminal of the power supply circuit 440 via the resistor 443e and connected to the breakage judgment circuit 442e as well. Moreover, the emitter terminal is connected to the emitter terminals of the IGBTs 30g and 30h being referenced via the ground terminal GND.

Figure 3:
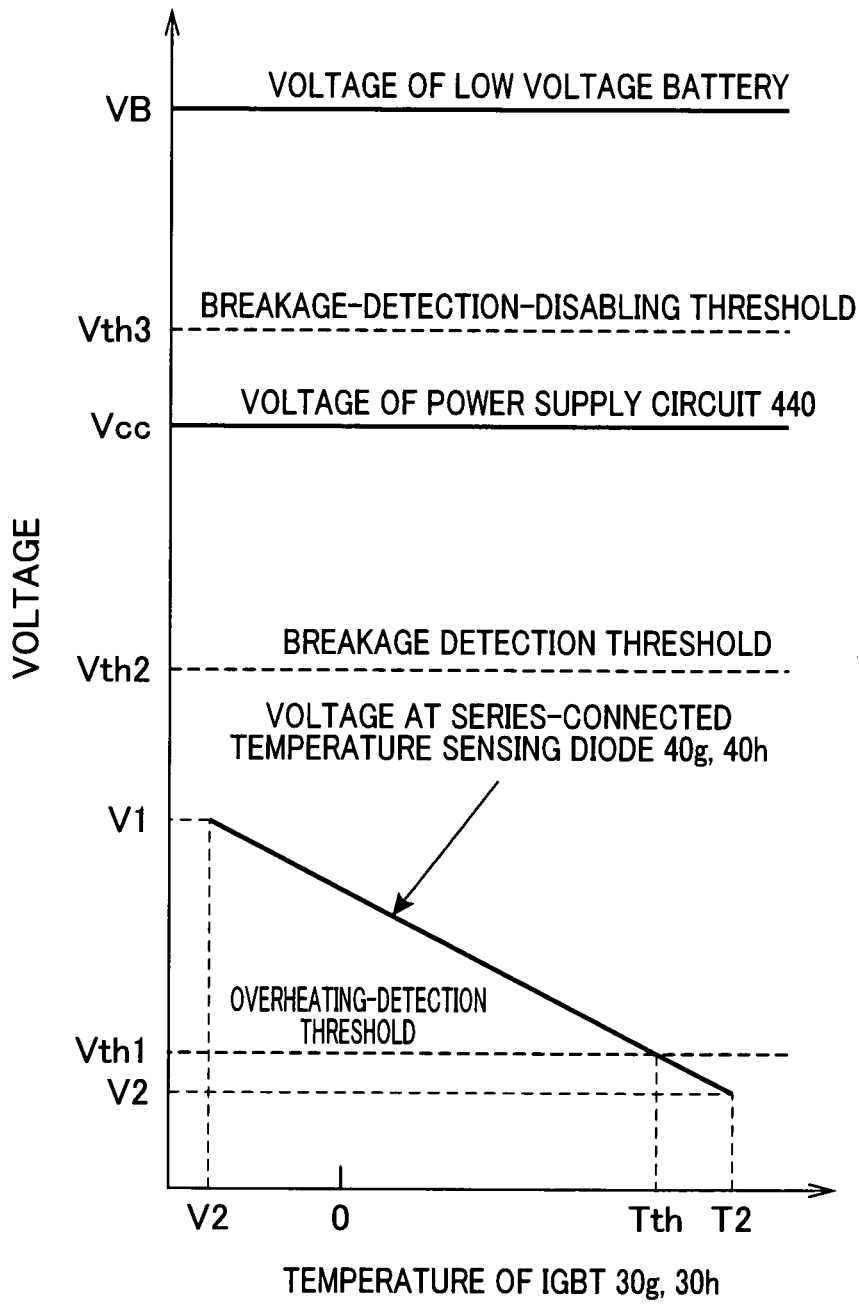
FIG. 3 is a graph showing a relationship between the voltage of a temperature sensing diode against the temperature of the IGBT and a relationship between respective threshold values.

When the constant current is supplied by the constant current circuits 441a and 441b, the temperature sensing diodes 40g and 40h output a voltage lower than the output voltage of the power supply circuit 440. As shown in FIG. 3, the voltage of the series-connected temperature sensing diodes 40g and 40h decreases as the temperature rises. That is, the voltage V1 when the temperature is T1 (which is lower than 0 deg C.) decreases to voltage V2 when the temperature becomes T2 which is higher than 0 deg C.

The overheating-detection threshold Vth1 is set to be lower than the output voltage Vcc of the power supply circuit 440 and within a voltage range V1 to V2 where the series-connected temperature sensing diodes 40g and 40h are capable of outputting the voltage (i.e. within output-capable-voltage range), and set to be a value corresponding to the overheating temperature threshold Tth which is used for a reference to determine the overheating. The breakage-detection threshold Vth2 is lower than the output voltage of the power supply circuit 440 and out of the voltage range V1 to V2 (i.e. out of output-capable-voltage range), and set to be a voltage higher than V1. The breakage-detection-disabling threshold Vth3 is set to be higher than the output voltage Vcc of the power supply circuit 440 and set to be lower than the voltage VB.

The ICs 41, 42, 43, 45 and 46 as shown in FIG. 1 are configured by the same configuration of the IC 44 as described above.

The control unit 5 as shown in FIG. 1 controls the IGBTs 30a to 30l. The control unit 5 turns OFF IGBTs where abnormality has been detected by the temperature detecting apparatus 4. The abnormality includes an overheating among the IGBTs 30a to 30l or breakage among the temperature sensing diodes 40a to 40l. The control unit 5 is connected to the temperature sensing ICs 41 to 46. Specifically, the control unit 5 is connected to the output terminal of the overheating signal output circuit 441g of the overheating-detection circuit 441 and the output terminal of the breakage signal output circuit 442e. The control unit 5 performs the same control for ICs 41, 42, 43, 45 and 46.

Figure 4:
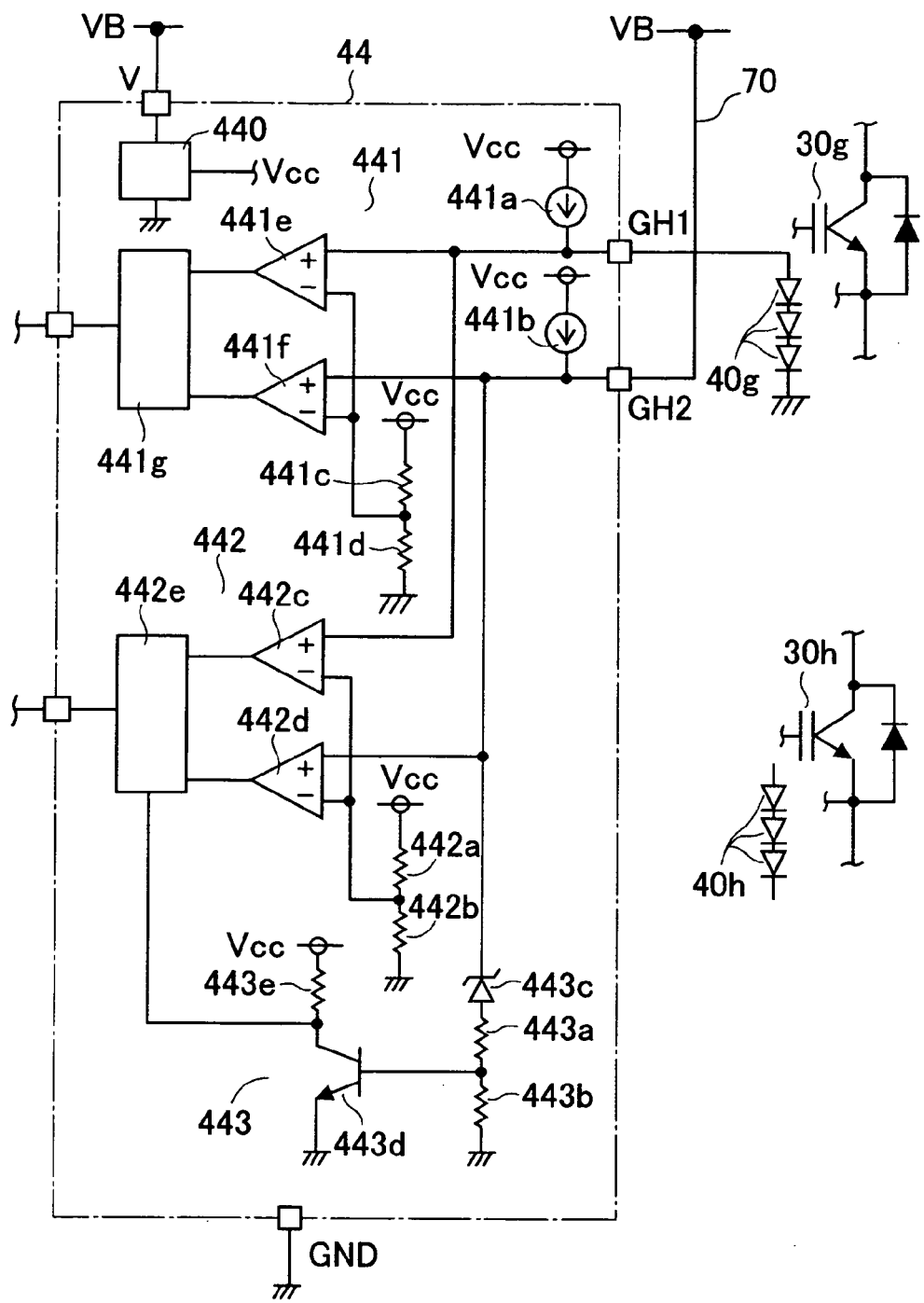
FIG. 4 is a circuit diagram of the temperature detecting apparatus when some of the temperature sensing diodes are not connected thereto.

Next, with reference to FIGS. 1 to 4, operation of the motor control apparatus is described as follows. FIG. 4 is a circuit diagram of the temperature detecting apparatus when some of the temperature sensing diodes are not connected thereto, as a configuration of the temperature detecting apparatus. That is, the configuration whether or not the temperature sensing diode is connected depends on the specification of the motor control apparatus 1, and is set prior to shipping thereof.

When the ignition switch of the vehicle (not shown) turns ON, the motor control apparatus 1 starts to operate. The DC high voltage of the high voltage battery 31 is smoothed by the smoothing capacitor 2. The control circuit 4 controls IGBTs 30a to 30l that constitutes the inverter circuit 3 based on the drive signal inputted externally. Specifically, the control circuit 4 controls IGBT 30a to 30l to be ON and OFF at a predetermined period. The inverter circuit 3 converts the DC high voltage smoothed by the smoothing capacitor 2 into the three-phase AC voltage and supplies the converted three-phase AC voltage to the vehicle drive motor M1. Thus, the motor control apparatus 1 controls the vehicle drive motor M1.

Assuming the IGBT 30h as shown in FIG. 2 overheats so that the temperature of the IGBT 30h exceeds the overheating temperature threshold Tth, the voltage of the series-connected temperature sensing diode 40h decreases to below the overheating-detection threshold Vth1. Then, the comparator 441f as shown in FIG. 2 outputs low level signal. As a result, the overheating signal output circuit 441g outputs overheating signal to the control unit 5 and the control unit 5 turns the IGBTs 30g and 30h OFF.

Meanwhile, for example, when any one of the series-connected temperature sensing diode 40h as shown in FIG. 2 is broken, the diode connection terminal GH2 is connected to the power supply circuit 440 via the constant current circuit 441b. Therefore, the voltage at the diode connection terminal GH2 becomes the output voltage Vcc of the power supply circuit 440, which is larger than the breakage-detection threshold Vth2 as shown in FIG. 3. Accordingly, the comparator 442d as shown in FIG. 2 outputs high level signal and the breakage signal output circuit 442e outputs breakage signal to the control unit 5. As a result, the control unit 5 turns the IGBTs 30g and 30h OFF.

Next, with reference to FIG. 4, operation of the motor control apparatus in which the temperature sensing diode (i.e., temperature sensing diode 40h) is not connected is described as follows.

As shown in FIG. 4, the temperature sensing diode 40h is not connected to the diode connection terminal GH2. However, the voltage VB is applied instead. Specifically, the diode connection terminal GH2 is tied to the voltage VB by a wire 70 (i.e., voltage apply circuit). Therefore, the voltage of the diode connection terminal GH2 is voltage VB and becomes higher than the breakage-detection-disabling threshold Vth3. Then, the voltage at the connection point where the resistors 443a and 443b are connected in series rises to an enough voltage to turn ON the transistor 443d so that the transistor 443d turns ON to output low level signal. The breakage signal output circuit 442e disables detecting breakage of the temperature sensing diode 40h and the wiring thereof. Hence, even when the temperature sensing diode 40h is not connected to the diode connection terminal GH2, the breakage signal is not outputted. Meanwhile, when breakage of the temperature sensing diode 40g or the wiring thereof occurs, a breakage signal is outputted thereby.

As described above, series-connected diodes are employed for a temperature sensing function, however, thermistors can be used for the temperature sensing function alternatively.

Next, advantage of the present application will be described as follows. According to the embodiment, the temperature sensing IC 44 is configured by the overheating detecting circuit 441, the breakage detecting circuit 442 and the breakage-detection-disabling circuit 443. The breakage-detection-disabling circuit 443 is configured to stop detecting breakage by the breakage detecting circuit 442 when the voltage at the diode connection terminal GH2 is higher than the breakage-detection-disabling threshold Vth3 that is set higher than the overheating-detection threshold Vth1 and the breakage-detection threshold Vth2. When the temperature sensing diode 40h is not connected to the diode connection terminal GH2, voltage higher than the breakage-detection-disabling threshold Vth3 is applied to the diode connection terminal GH2. As a result, when the temperature sensing diode 40h is not connected to the diode connection terminal GH2, detecting breakage can be disabled without using a dummy resistor which is used in a conventional apparatus.

According to the embodiment, the overheating-detection threshold Vth1 and the breakage-detection threshold Vth2 are set to be lower than the voltage of the power supply circuit 440. The breakage-detection-disabling threshold Vth3 is set to be higher than the power supply circuit 440 and to be lower than the voltage VB. When the temperature sensing diode 40h is not connected to the Vth3, the voltage VB is applied to the diode connection terminal GH2. Therefore, the breakage-detection-disabling threshold Vth3 can be reliably set to be higher than the overheating-detection threshold Vth1 and the breakage-detection threshold Vth2. Also, voltage higher than the breakage-detection-disabling threshold Vth3 can be reliably applied to the diode connection terminal GH2. Accordingly, when the temperature sensing diode is not connected to the diode connection terminal GH2, detecting breakage can be reliably disabled without using a dummy resistor which is used in a conventional apparatus.

Further, according to the embodiment, the overheating-detection threshold Vth1 and the breakage detecting threshold Vth2 are set by the voltage Vcc of the power supply circuit 440 being divided by the resistors 441c and 441d, and the resistors 442a and 442b respectively. Hence, the overheating threshold Vth1 and the breakage detecting threshold Vth2 can be reliably set lower than the voltage of the power supply circuit 440.

Furthermore, according to the embodiment, the temperature sensing diodes 40a-40l which are disposed integrally with the IGBTs 30a to 30l are employed. Therefore, voltages based on the respective temperatures of the IGBTs 30a to 30l can be reliably obtained.

What is claimed is:

1. A temperature detecting apparatus that detects temperature of an object, the apparatus comprising:
    a temperature sensing element that outputs voltage responding to the temperature of the object, the voltage outputted by the temperature sensing element having a predetermined voltage range;
    an element connection terminal capable of connecting the temperature sensing element;
    an overheating detecting circuit that detects overheating of the object, the overheating detecting circuit detecting the overheating based on a comparison between a voltage at the temperature sensing element and an overheating detection threshold being set within the predetermined voltage range;
    an abnormality detecting circuit that detects an abnormality of the temperature sensing element and a wiring of the temperature sensing element, the abnormality detecting circuit detecting an abnormality based on a comparison between the voltage at the temperature sensing element and an abnormality detection threshold being set beyond the predetermined voltage range;
    a disabling circuit that disables the abnormality detecting circuit from detecting an abnormality of the temperature sensing element when the voltage at the temperature sensing element is higher than a disabling threshold being set higher than the overheating detection threshold and the abnormality detection threshold; and
    a voltage apply circuit that applies a voltage higher than the disabling threshold to the element connection terminal when the temperature sensing element is not connected to the element connection terminal,
    wherein the overheating detecting circuit, the abnormality detecting circuit and the disabling circuit are integrated into an integrated circuit.

2. The temperature detecting apparatus according to claim 1, wherein
    the temperature detecting apparatus includes a power supply circuit being integrated to the integrated circuit, the power supply circuit generates a regulated voltage to be lower than a voltage of a DC power source and supplies the regulated voltage to the overheating detecting circuit, the abnormality detecting circuit and the disabling circuit,
    the overheating detection threshold and the abnormality detection threshold are set to be lower than the regulated voltage,
    the disabling threshold is set to be higher than the regulated voltage and lower than the voltage of the DC power source and
    the voltage of the DC power source is applied to the element connection terminal when the temperature sensing element is not connected to the element connection terminal.

3. The temperature detecting apparatus according to claim 2, wherein the temperature sensing element is at least one diode.

4. The temperature detecting apparatus according to claim 2, wherein the object is a switching element disposed in a power conversion apparatus.

5. The temperature detecting apparatus according to claim 1, wherein the overheating detection threshold and the abnormality detection threshold are set to be a voltage divided from the regulated voltage.

6. The temperature detecting apparatus according to claim 5, wherein the temperature sensing element is at least one diode.

7. The temperature detecting apparatus according to claim 5, wherein the object is a switching element disposed in a power conversion apparatus.

8. The temperature detecting apparatus according to claim 1, wherein the temperature sensing element is at least one diode.

9. The temperature detecting apparatus according to claim 8, wherein the at least one diode is a plurality of diodes which are connected in series.

10. The temperature detecting apparatus according to claim 8, wherein the object is a switching element disposed in a power conversion apparatus.

11. The temperature detecting apparatus according to claim 1, wherein the temperature sensing element is a thermistor.

12. The temperature detecting apparatus according to claim 1, wherein the object is a switching element disposed in a power conversion apparatus.

13. The temperature detecting apparatus according to claim 12, wherein the temperature detecting apparatus is mounted on a vehicle and supplies power to a vehicle drive motor.

* * * * *